United States Patent [19]
Panagrossi

[11] Patent Number: 6,104,317
[45] Date of Patent: Aug. 15, 2000

[54] DATA ENTRY DEVICE AND METHOD

[75] Inventor: Jerry Panagrossi, Sunnyvale, Calif.

[73] Assignee: Motorola, Inc., Schaumburg, Ill.

[21] Appl. No.: 09/032,123

[22] Filed: Feb. 27, 1998

[51] Int. Cl.$^7$ .................................................. G09G 5/34
[52] U.S. Cl. .............................. 341/20; 341/22; 341/23; 345/168; 345/173; 345/179; 178/18.01; 382/186
[58] Field of Search ................................ 341/20, 22, 23, 341/26; 345/173, 179, 163, 168, 123, 354, 172; 178/17 C, 18.01, 18.03; 382/230, 186

[56] References Cited

U.S. PATENT DOCUMENTS

| | | | |
|---|---|---|---|
| 5,231,698 | 7/1993 | Forcier | 395/146 |
| 5,488,204 | 1/1996 | Mead | 178/18.01 |
| 5,534,893 | 7/1996 | Hansen | 345/179 |
| 5,590,257 | 12/1996 | Forcier | 395/792 |
| 5,724,449 | 3/1998 | Cornerford | 382/230 |
| 5,812,117 | 9/1998 | Moon | 345/169 |
| 5,818,451 | 10/1998 | Bertram | 345/354 |
| 5,880,411 | 3/1999 | Gillespie | 345/157 |
| 5,903,229 | 5/1999 | Kshi | 341/20 |
| 5,909,211 | 6/1999 | Combs | 345/172 |

*Primary Examiner*—Michael Horabik
*Assistant Examiner*—Albert K. Wong
*Attorney, Agent, or Firm*—Hugh C. Dunlop

[57] ABSTRACT

A data entry device with a digitizer (20) having key input regions (21) for receiving stroke inputs. Key input region have multiple characters indicated on them. The digitizer has an output providing x and y co-ordinate data for stroke inputs. A computational device (30) accepts x and y co-ordinate data from the digitizer, identifies a key input region in which a stroke is entered and measures parameters of the entered stroke. A memory (31) has correlation information correlating stroke parameters for a given key input region with characters indicated on that input region.

12 Claims, 3 Drawing Sheets

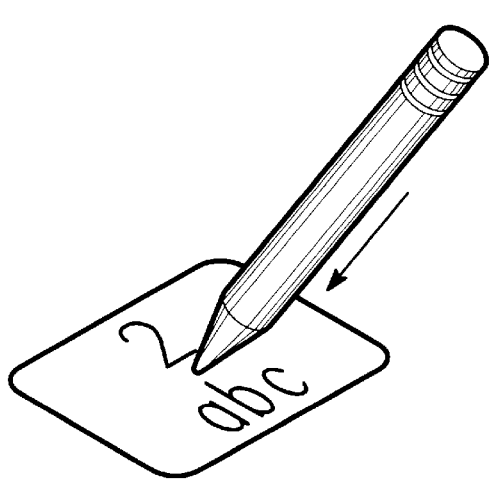
FIG. 1
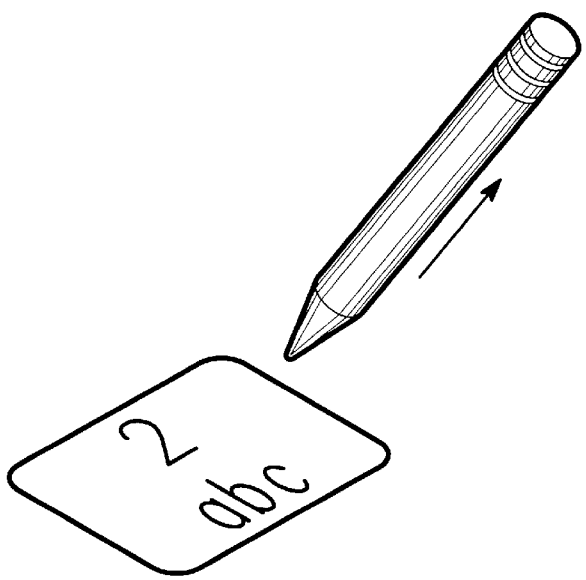
FIG. 2
FIG. 3A
FIG. 3B
FIG. 4A
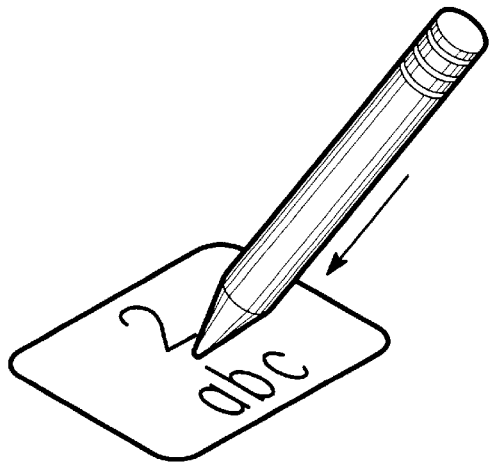
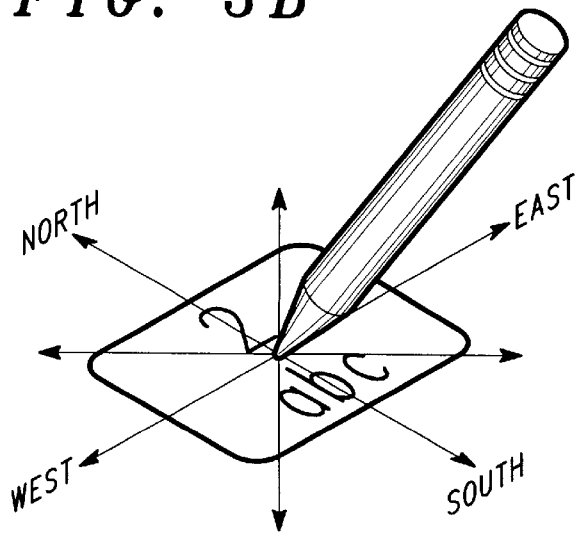
FIG. 4B

|     | TAP | FLICK |     |     |     |
|-----|-----|-------|-----|-----|-----|
|     |     | N     | S   | E   | W   |
| B0  | 0   | ?     | A/a | −   | +   |
| B1  | 1   | ^     | ~   | ..  | o   |
| B2  | 2   | b     | b   | c   | a   |
| B3  | 3   | e     | e   | d   | f   |
| B4  | 4   | h     | h   | g   | i   |
| B5  | 5   | k     | k   | j   | l   |
| B6  | 6   | n     | n   | m   | δ   |
| B7  | 7   | q     | r   | p   | s   |
| B8  | 8   | u     | u   | t   | v   |
| B9  | 9   | x     | y   | w   | z   |
| B11 |     |       | CLEAR ALL | DELETE WORD | BACKSPACE |
| B12 |     | TAB   | RETURN | SPACE |   |

*FIG. 7*

| | | | |
|---|---|---|---|
| $-t<\Delta x<t$ | AND | $t<\Delta y<t$ | $\Rightarrow$ TAP |
| $-t<\Delta x<t$ | AND | $\Delta y>t$ | $\Rightarrow$ N |
| $-t<\Delta x<t$ | AND | $\Delta y<-t$ | $\Rightarrow$ S |
| $\Delta x>t$ | AND | $-t<\Delta y<t$ | $\Rightarrow$ E |
| $\Delta x<-t$ | AND | $-t<\Delta y<t$ | $\Rightarrow$ W |
| $\Delta x>t$ | AND | $\Delta y>t$ | $\Rightarrow$ NE |
| $\Delta x>t$ | AND | $\Delta y<-t$ | $\Rightarrow$ SE |
| $\Delta x<-t$ | AND | $\Delta y>t$ | $\Rightarrow$ NW |
| $\Delta x<-t$ | AND | $\Delta y<-t$ | $\Rightarrow$ SW |

*FIG. 8*

DATA ENTRY DEVICE AND METHOD

FIELD OF THE INVENTION

This invention relates to a data entry device, for example a device for entering text on a character-by-character basis into a target device. It also relates to a method of data entry.

BACKGROUND OF THE INVENTION

In the consumer electronics era there is an increasing demand for small, portable devices into which text can be entered, such as personal digital assistants, notebook computers, pagers, cellular telephones and similar devices. In such devices there is a need for entry of a rich alphabet of characters. For example, the Roman alphabet has 26 characters, which can be represented in upper and lower case. Additionally, non-alphabet characters need to be entered, such as digits, punctuation marks and the like. In other languages, such as Chinese, the number of characters needed to be entered is even greater.

In conflict with this need for a rich set of characters is the confinement of space that accompanies a portable device. There is a demand for fewer and fewer keys on a keyboard. It is not always acceptable to merely reduce the size of keys in order to provide a full set of characters in a confined space. Users have limited dexterity and are unsatisfied with a full keyboard comprising very small keys.

To address this conflict between the need for a rich set of characters and a limited set of keys, proposals have been put forward for disambiguation of data entry, where pressing of a key gives an ambiguous character entry and where a dictionary and a language model are used to disambiguate and determine which individual character is intended. Such approaches are of limited value. Such approaches have difficulty handling out-of-vocabulary word entry and can be frustrating to the user.

What is needed, therefore, is a data entry device and a method of data entry enabling character-by-character input from a device having a limited set of keys. What is needed is a method of uniquely (or with minimal ambiguity) identifying individual characters for entry from individual key entry actions by a user.

BRIEF DESCRIPTION OF THE DRAWINGS

A preferred embodiment of a data entry device and method is now described, by way of example only, with reference to the following drawings.

FIG. 1 shows a layout of a twelve-key keypad.

FIG. 2 shows the keypad of FIG. 1, with button reference titles for ease of description of the invention.

FIG. 3 shows an entry action on a button of the keypad on FIG. 1, using a stylus in a tap-action.

FIG. 4 shows a data entry action on a button of FIG. 1 using a stylus in a flick action.

FIG. 7 is a look-up table of input actions and buttons, used in the processor of FIG. 6.

FIG. 8 is an illustration of a series of threshold comparison steps used in the processor of FIG. 6.

DETAILED DESCRIPTION OF THE DRAWINGS

In the following description, a method of data entry is described in which a pointing device such as a pen, stylus or a user's finger is used in conjunction with a touch panel device (otherwise referred to as a digitizer) to facilitate data entry. The touch panel device is a hardware device that enables resistive or comparative input (or indeed inductive or other input) through the use of a finger or pointing device. Input from a touch panel device is typically represented as a sequence of x and y points.

Referring to FIG. 1, a set of keys is illustrated, are presented on a touch panel device. The keys may be presented on the device in a fixed, static surface image or on a liquid crystal display or other display or screen having a digitizer extending across the screen. The keypad is simply a graphic image either displayed on or directly below the surface of the touch panel. The rectangular boundary of each key shown in FIG. 1 corresponds to an input area, called a button. There are preferably at least twelve buttons for text input. As is described in greater detail below, software in the device maintains a one-to-one mapping of twelve rectangular boundaries, of where each rectangular boundary corresponds to one of the twelve keys shown in FIG. 1. The twelve buttons of the front keypad are referenced as B1–B12, as shown in FIG. 2.

Using a pointing device, nine physical actions can be performed on each button. These actions are a tap-action and eight flick actions, now described in detail.

To perform an action, a user taps a selected button with a pointing device as shown in FIG. 3A and FIG. 3B. The pointing device contacts the touch panel within the rectangular boundary of a selected button and the pointing device is lifted while it is still positioned within the same boundary.

A flick action comprises contacting the touch panel within the boundary of a button and, while still depressing the pointing device, flicking or dragging the pointing device in any of eight compass directions away from the point of contact. The pointing device is lifted once it has been dragged outside the rectangular boundary of the buttons. This is illustrated in FIGS. 4A and 4B. The eight possible directions are referred to as North, South, East, West, Northeast, Northwest, Southeast and Southwest. There may, of course be fewer or more directions, e.g. four or six.

Figure 5:
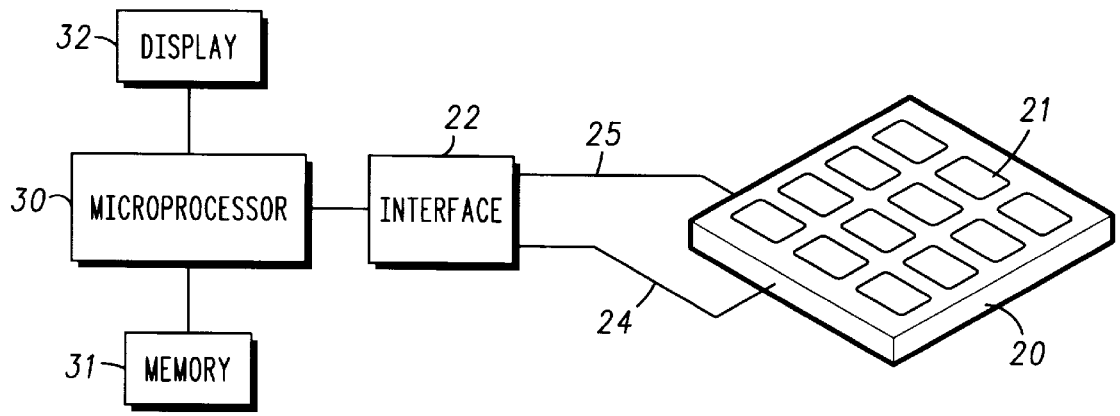
FIG. 5 is a block diagram showing elements of the data entry device according to the present invention.

The data entry device is not complex in terms of apparatus and is illustrated in FIG. 5. It comprises a touch panel 20 having buttons 21 marked thereon. The touch panel 20 is connected to an interface 22 by x and y coordinate outputs 24 and 25 respectively. The interface 22 is connected to a processor 30. The processor 30 may be a general purpose processor or a microprocessor or a dedicate control device, such as an application specific integrated circuit. The processor 30 is coupled to a memory 31 and a display 32. The processor 30 performs a process as illustrated if FIG. 6. The process starts at step 100 when the pointing device contacts the digitizer 20 within the boundary of one of the buttons 21. This action causes a pair of pen-down coordinates (x1, y1) to be registered in step 101, together with an identification B1 to B12 of the button activated. When the pointing device is lifted from the digitizer 20, step 102 is activated in which the pen-up action causes a second pair of coordinates (x1, y2) for the pen-up point to be registered. The terms "pen-up" and "pen-down" are used for convenience, but it will be appreciated that the pointing device does not necessarily (but may) have pen functionality.

In step 103, the values for Δx and Δy are calculated, being the x displacement and the y displacement respectively of the pen between pen-down and the pen-up points. In step 104, the x and y displacements are compared with one or more thresholds to determine whether a tap entry of a flick entry has been entered and, in the case of a flick entry, to determine the direction of the flick entry. Further details of step 104 are described below. Proceeding to step 105, a look-up operation is performed by the processor 30 in the memory 31, to look up in a table such as the table of FIG. 7. A result corresponding to the tap or flick entry is identified. Proceeding to step 106, the entry identified is delivered to an output buffer of the microprocessor 30 and displayed in the display 32. The processor for one complete character entry is concluded and ends at step 110.

Referring to FIG. 7, a table is shown illustrating examples of digit and characters delivered when certain tap and flick actions are identified in respective data input areas.

In FIG. 7, the data input region is listed in the left hand column, identifying the data input region FIG. 2 (B0–B12) and to the right of this column are further columns corresponding to a tap action and various flick actions. For a given tap or flick action identified across the top of the table, and for a given data input region identified in the left hand column, the corresponding position in the table identifies the character or operation that corresponds to that data input action. Thus, for example, a tap in data input region B2 delivers the digit '2' while a north or south flick in the same data input region delivers the character 'b'.

Various operations can be activated by data input actions in selected input regions. For example, a south flick in region B0 causes a toggling between upper and lower case letters. An east flick in region B11 causes deletion of the last entered word, while a west flick in the same region causes a backspace. Other actions in the table are self explanatory. There are some blank spaces in the table, which a designer of average skill in the art can utilize for further data input or further editing actions.

The table of FIG. 7 can be expanded to include Northeast, Northwest, Southeast and Southwest actions.

It is apparent from the table of FIG. 7 that where a button displays three letters, the first letter can be entered by a flick-West action on the button, the second letter can be entered by a flick-North or a flick-South action and the third letter can be entered by a flick-East action. These rules apply to buttons B2, B3, B4, B5, B6 and B8 of FIG. 2. It is also apparent from the table of FIG. 7 that where a button displays four letters, the first letter can be entered by a flick-West action, the second letter can be entered by a flick-North action, the third letter can be entered by a flick-South action and the fourth letter can be entered by a flick-East action. These rules apply to buttons B7 and B9 of FIG. 2. North and South flick actions can alternatively deliver the third and second letters respectively of a four-letter button.

Figure 6:
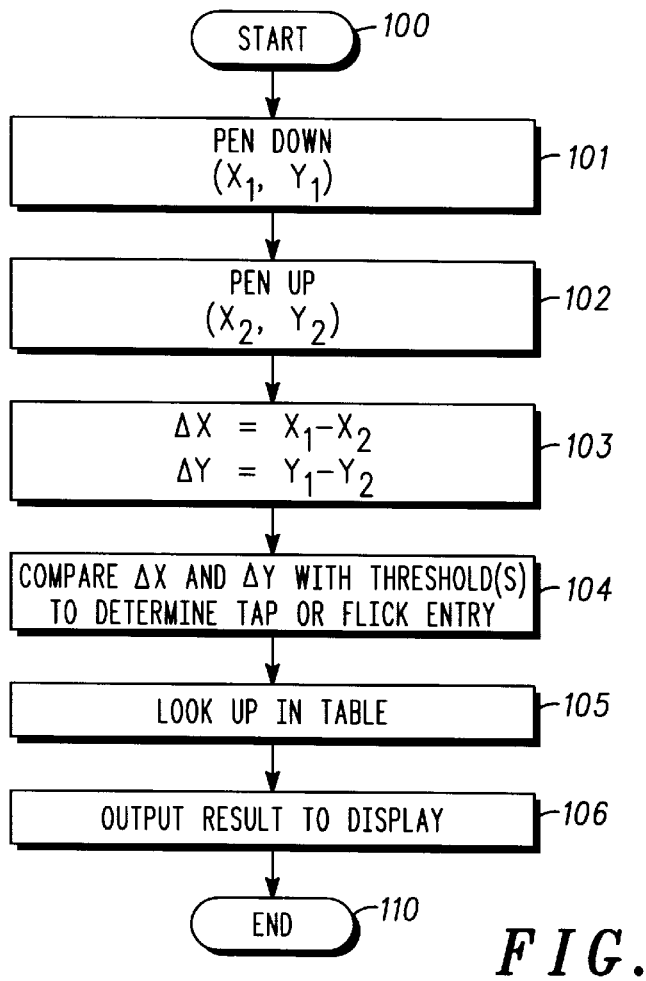
FIG. 6 is a flow diagram illustrating operation of the processor of the device of FIG. 5.

It will be understood by one skilled in the art that the look-up operation of step 105 of FIG. 6 and the table of FIG. 7 can be replaced by a series of conditional decisions or rules.

In summary, a flick action required to enter a particular letter depends on where the letter is located in relation to its neighboring letters on a button.

Each letter entered into the device appears in either upper case or lower case and the case depends on the current letter at the case settings. The term 'Caps' can be displayed on display 32 as a way to provide visual feedback for identifying the current letter case setting. The letter case setting can be changed by a device having specific command to one of the buttons, for example a flick-South action on button B0.

Punctuation beyond the punctuation marks shown in the table of FIG. 7 can be entered by allowing for identification of eight compass-point flick actions on a button such as button B0. Eight directional entries on button B0 can correspond to the following punctuation: ',-, ., „ +, !, ?, and "toggle upper case/lower case".

If, when entering a punctuation character, the user drags the pointing device outside the rectangular boundary of button B0, the character inserted into the display text will change automatically to the punctuation character that corresponds to where the pointing device is currently positioned, compass-wise outside the boundary of B0. When the user lifts the pointing device, the punctuation character last entered will remain in the display text.

Button B1 is used to apply accent marks to characters that already exist in the display text. When an accent mark is entered, it is applied to the character that immediately precedes the text cursor. Accent marks are applied only to letters that are able to receive them; otherwise, accent marks entered by the user are discarded. The set of accent marks assigned to B1 can vary from one target device to another. An example of a set of accent marks assigned to button B1 is illustrated in the second line of FIG. 7, which shows a circumflex, a tilde, an umlaut, and a ring. Additionally, a grave accent can be included, corresponding to a Northwest movement of the pointing device and an acute accent can be included, corresponding to a Northeast movement.

Other device-specific commands can be assigned to buttons. For example a target device's backlight can be toggled on and off by a device having a specific command.

Referring to FIG. 8, an example of implementation of the step of box 104 of FIG. 6 is shown, in which x and y displacements are compared with a threshold t. As an example, the threshold t can be the distance between the center and the edge of a button. From the x and y displacements, a tap action or a North, South, East, or West flick action or a Northeast, Southeast, Northwest or Southwest flick action is identified.

It will be appreciated that other implementations of boxes 103 and 104 can be devised. Thus, instead of measuring x and y displacements, absolute values for x2 and y2 can be determinative of the tap or flick action identified. In such an implementation, a determination is made as to whether the x2 value and the y2 value lies outside the relevant button boundary, and its position outside the button boundary.

It will also be appreciated that the thresholds for determination of flick actions need not coincide exactly with the button boundary as marked on the digitizer 20. Thus, a flick action that ends within the marked boundary can be sufficient for identifying a flick action, provided that there is sufficient displacement of the pen-up position relative to the pen-down position for a flick action to be distinguished from a tap action. Thus, for example, a pointer device movement from bottom left to top right of a button, within the boundary of the button, can be identified as a Northeast flick, etc. It is not necessary for the flick action to begin at the center of the button.

Advantageously, the letters and numeral displayed in the buttons are separate and dispersed in a manner that corresponds to the flick action necessary to identify the particular digit or letter. For example, on button B2, the letter 'a' can be displayed towards the left hand edge of the button, the letter 'b' towards the lower edge of the button and the letter 'c' close to the right hand edge of the button. Similarly on button B9, the letter 'x' can be displayed near the top edge of the button and the letter 'y' near the bottom edge. This has the advantage of providing a more intuitive indication for the user as to the direction the user needs to move the pointer device in order to select a given letter.

A computational device 30 (a microprocessor or general purpose processor) is coupled to the digitizer. The computational device 30 accepts x and y coordinate data from the digitizer and identifies a keyed region in which a stroke is entered. It measures parameters of the entered stroke, for example x and y displacements from pen-down to pen-up, or absolute x and y coordinates of a pen-up position. A memory 31 is provided coupled to the computational device. The memory has correlation information stored therein correlating stroke parameters for a given key input region with characters indicated on that input region. The correlation information can comprise a table such as illustrated in FIG. 7 or it can comprise a series of rules for identifying characters from stroke parameters.

The above description has been given by way of example only and modification of detail can be made by one of ordinary skill in the art without departing from the spirit and scope of the invention.

I claim:

1. A data entry device comprising:
   a digitizer having a plurality of key input regions for receiving stroke inputs, each key input region having a plurality of characters indicated thereon, the digitizer having an output providing x and y co-ordinate data for stroke inputs;
   a computational device coupled to the digitizer, the computational device accepting x and y co-ordinate data from the digitizer and identifying a key input region in which a stroke is entered and measuring parameters of the entered stroke; and
   a memory coupled to the computational device, the memory having stored therein correlation information correlating stroke parameters for a given key input region with characters indicated on that input region.

2. The data entry device of claim 1, wherein the digitizer has at least ten key input regions having at least twenty-six alphabetic letters indicated thereon, the letters being grouped into groups, there being one group per key input region, and wherein the memory has a table of alphabetic letters ordered by groups and by strokes, whereby a given stroke and group uniquely identify a character in the table.

3. The data entry device of claim 2, wherein the digitizer has at least two further key input regions and the table has non-alphabet character entries corresponding to the at least two further key input regions, the non-alphabet character entries being ordered by strokes, whereby a given one of the at least two further key input regions and a given stroke uniquely identify a non-alphabet character entry in the table.

4. The data entry device of claim 1, wherein the digitizer has at least one key input region with accents indicated thereon and the memory has stored therein correlation information correlating stroke inputs with accents.

5. The data entry device of claim 1, wherein the characters are indicated on an upper surface of the digitizer.

6. The data entry device of claim 1, wherein the characters are visible through the digitizer.

7. The data entry device of claim 1, wherein the computational device comprises means for distinguishing between a tap action and a flick action.

8. The data entry device of claim 1, wherein the computational device is arranged to identify a pen-up position following a pen-down action in a key input region and is arranged for uniquely identifying a character from the combination of the key input region and the pen-up position.

9. A method of data entry character-by-character, comprising:
   identifying a contact action by a contact device on a digitizer;
   identifying a key input region for the contact action,
   identifying a release action by the contact device from the digitizer;
   uniquely identifying a character from the combination of the key input region and the release action.

10. The method of claim 9, further comprising differentiating between a tap action and a flick action and, in cases of tap action identification, uniquely identifying a character from the key input region alone.

11. The method of claim 10 wherein the character is a digit.

12. The method of claim 9, wherein a set of a plurality of characters is indicated on a key input region of the digitizer and wherein a unique character from the set is selected dependent on a direction of movement of a flick action input.

* * * * *